July 24, 1956  E. H. B. BARTELINK  2,756,417
RADAR SYSTEM

Filed Dec. 11, 1945 2 Sheets-Sheet 1

INVENTOR
EVERHARD H. B. BARTELINK

BY  ATTORNEY

July 24, 1956  E. H. B. BARTELINK  2,756,417
RADAR SYSTEM

Filed Dec. 11, 1945  2 Sheets-Sheet 2

INVENTOR
EVERHARD H. B. BARTELINK

BY  m.o.Hayes

ATTORNEY

United States Patent Office 2,756,417
Patented July 24, 1956

2,756,417

RADAR SYSTEM

Everhard H. B. Bartelink, Cambridge, Mass., assignor, by mesne assignments, to the United States of America as represented by the Secretary of the Navy Application December 11, 1945, Serial No. 634,292

7 Claims. (Cl. 343—11)

This invention relates to an airborne radar apparatus for providing range information for a target selected and sighted optically by an aircraft pilot, and is particularly adapted to distinguish between the optically selected target and other nearby targets at the same range. The invention is also adaptable in certain embodiments for use in blind flying, in particular for homing on a beacon or for night fighting, and blind landing.

In airplanes equipped to fire airborne cannon or rockets, the pilot is given an optical sight and instructed to center the desired target on its cross hairs before firing. For short ranges, a fixed sight can be used but at long ranges corrections for the trajectory of the missile are needed. For point blank firing the pilot merely aims his sight, which is harmonized with the cannon or rocket, at the target, but when ballistic corrections are considered, the gun must be superelevated. The simplest way is to provide a fixed mounting for the gun or rocket launchers and to superelevate the whole airplane by the desired amount. This can be done by depressing the pilot's sight by this same amount, and again having the pilot aim his sight at the target. The correct amount of depression is supplied by the radar operator who constantly cranks in the range of the observed target pip. A ballistic cam converts the range data into the corresponding depression angles. Thus the pilot's eye which by nature has a very good angular resolution but poor range resolution supplies the angular information needed for the problem while the radar for which the reverse holds true supplies the range data. Thus each is used to best advantage.

For this purpose an apparatus to supply range data was devised, with which the radar operator could track a pip on an A-scope, presenting a target range, with a manually controlled range step and thereby crank in the necessary correction into the pilot's optical sight. The optical sight was not a direct part of the radar apparatus in any way but served only in pointing the plane and the gun at the selected target after which the radar gave the desired superelevation and range indication. The system so constructed worked satisfactorily on isolated targets, in particular over the sea on single ship targets. When used over land, however, or at a group of ships, so many echoes normally were present on the indicator that it was impossible for the radar operator to identify the desired target. Accordingly, a new apparatus and technique were essential for this latter purpose.

The object of the present invention, therefore, is to provide a radar system for indicating the range of an optically sighted target especially adapted for distinguishing the desired target from a multitude of other targets at various different ranges so that the radar operator can identify on the indicator the target at which the pilot is pointing.

Another object is to provide a simplified radar presentation system adapted for homing on a target enabling the plane to pursue or attack in conditions of darkness or bad visibility.

Another object is to provide a radar presentation system useful in blind flying by enabling homing on a beacon or outstanding radar reflector as an aid to navigation and blind landing approach of aircraft in darkness or bad weather.

Another object is to provide a simple presentation to enable and facilitate blind landing procedure.

Another object is to provide a simplified radar presentation system by which searching can be accomplished over the area covered by a conical scanning gun laying radar beam simultaneously with the aiming function, or in other words to provide a panoramic representation simultaneously with the target tracking.

Other features and objects will appear in the following detailed specification together with the drawings, in which.

The present invention uses a conical scan antenna and avoids the complexity of the ordinary gun laying systems by use of a novel type of presentation, called a V-presentation, which displays range horizontally, angular rotation of the spinner vertically, and echoes as intensity modulation.

Figure 1:
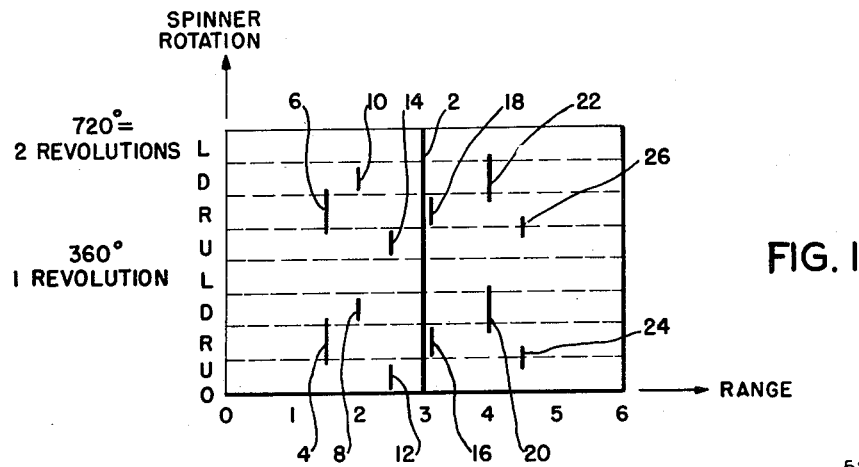
Fig. 1 represents the character of the indication on the indicator scope in accordance with this invention.

Referring now to Fig. 1, there is shown the V-presentation indication produced by this invention. A horizontal linear sweep is triggered by the transmitted pulse and a vertical sweep is triggered at one-half the frequency of the rotating conical scanner antenna. The various target echoes signals are impressed on the oscilloscope as intensity modulation. Thus, range is displayed horizontally, angular rotation of the scanner vertically, and echoes as intensity modulation.

A target directly on the sight axis produces constant echoes and these show up as a vertical line 2 of constant intensity displayed at the corresponding range. A target not on the sight axis produces echoes of different intensities as the antenna beam scans around and thus results in intensity modulation of the oscilloscope electron beam. In consequence there will show up on the screen at their proper ranges, dots or dashes or broken lines depending upon the amount of modulation, as for example, the respective segment pairs 4 and 6, 8 and 10, 12 and 14, 16 and 18, 20 and 22, and 24 and 26. In this way simultaneous information on many targets is presented yet the desired target 2 stands out clearly.

In other words, the selected target is constantly on the axis of the conical scan because the pilot is flying his plane so as to point at it through the optical sight and its return echo is constant while other targets are modulated as the beam goes around. In order to do this a mechanism is provided to keep the optical sight axis and the scanner axis parallel.

As the range to the target decreases the radar operator cranks a range marker to move with it and change the superelevation of the gunsight. It should be noted that the operation of the system as described refers to good visual conditions and against targets furnishing a good radar return.

If two targets are at equal ranges, one being on the sight axis, and the other off the sight axis there will result a superposition of the effects due to each one respectively. Because of the on-axis constant signal component the indication intensity does not go to zero but the selected target will show up as a constant line with the modulation of the off-axis target combined with it to show an unbroken but modulated line. Thus if moderate amounts of off-axis reflections are received from exactly the same ranges as the on-axis target, the operator can find the correct target by looking for the line that has the least modulation. If a particular target area produces an excessive amount of such off-axis reflections this may make detection impossible, but such cases would not be of frequent occurrence.

Figure 2:
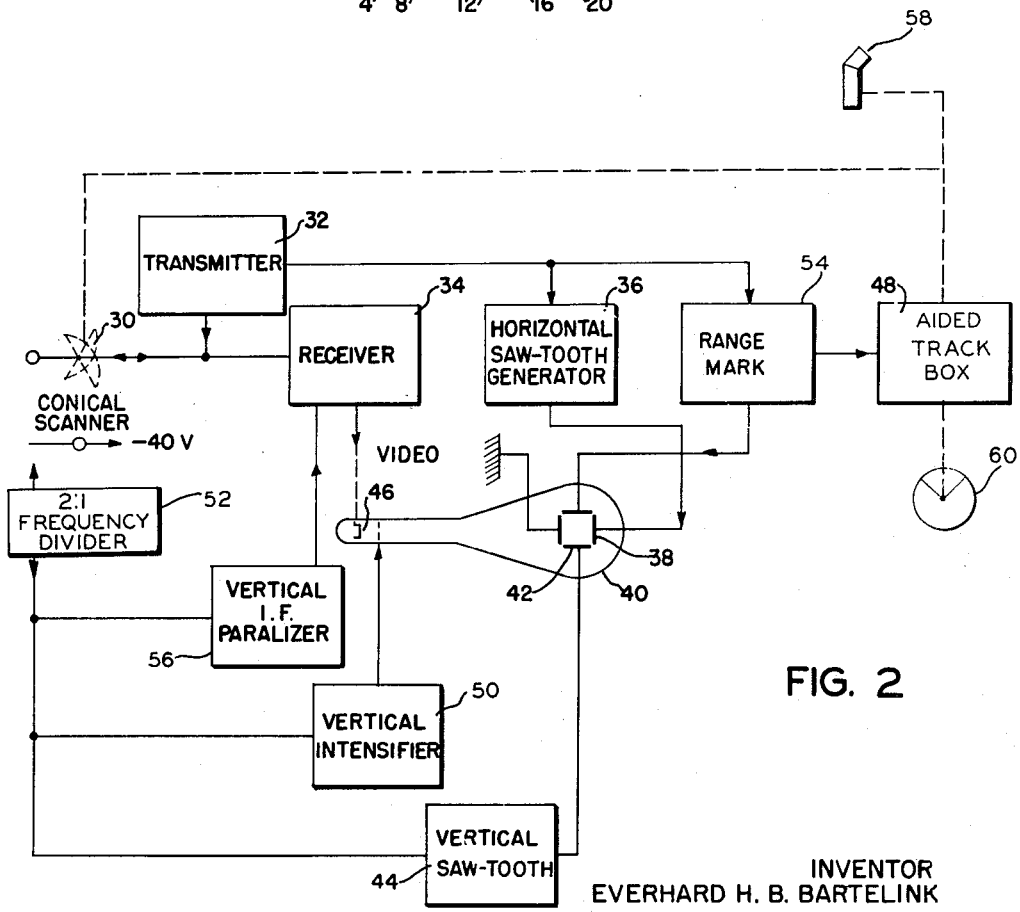
Fig. 2 is a block diagram showing the components of a system for accomplishing the ranging objects of this invention.

Referring now to Fig. 2, there is shown the block diagram comprising a conical scan antenna 30 (or scanner) connected to a transmitter 32 and a receiver 34. The transmitter triggers a horizontal sawtooth generator 36 which provides a linear sawtooth voltage at the normal transmitter repetition rate to be applied to the horizontal deflection plates 38 of a cathode ray oscilloscope 40 to provide the horizontal sweep. Instead of applying the video signals from the receiver 34 to the vertical deflection plates 42 of the oscilloscope 40, they are applied to grid or as shown here to the cathode 46. A sawtooth voltage is also applied to the vertical plates 42. The closing of a contact on the scanner 30 triggers a sawtooth generator 44 which by preference is made to run at one-half the scanner frequency by sending the scanner trigger through a 2:1 frequency divider 52. Thus, if the scanner 30 runs at 40 C. P. S., the sawtooth 44 will produce a vertical deflection at 20 C. P. S. repetition rate.

Video signals from the receiver 34 are applied as intensification voltages to the cathode 46 of the oscilloscope 40, serving to intensify the beam and produce a trace modulated accordingly.

The two to one ratio of scan to vertical trace is provided to assure unambiguity in the reading of the scope presentation. So long as there is any modulation at all there will be a visible break in the trace which in a one to one presentation might be mistaken for the dark region beyond the edges of the scan.

Assume that the pilot has his optical sight (and thus also the axis of the spinner), pointing at the desired target and that several other "interfering" targets are present. Due to the vertical sawtooth every horizontal sweep will be described slightly higher on the cathode ray tube than the preceding one. If the scanner runs at 40 C. P. S. and the horizontal deflection system at a rate of 1200 C. P. S., then 30 horizontal traces are described for every scan. In the present assumed case of a 2:1 synchronizing ratio this results in 60 traces across the tube.

For those targets at which the axis of the crossed lobe system is pointing the average receiver signals are independent of the position of the scanner. Thus at the range of the desired signal a number of dots all of equal intensity will appear on the scope screen, each one being directly above the previous one. These merge and will be observed as a vertical bright line of constant intensity. For all targets which are off the axis of the system this average signal will vary with the rotation of the scanner. In one scanner position, it will have a maximum and 180° later a minimum. Thus the average signal from this target will be modulated in a periodic fashion, in fact, nearly sinusoidally. In the two (or more) revolutions of the scanner which appear in every vertical sweep, there will appear either a visibly modulated signal, a dashed line or two short dots, depending on the degree of modulation. The resulting presentation is as shown in Fig. 1. It is now easy for the operator to find the one "straight" line between the many dashed and dotted lines, thus recognize the desired signal and move a range marker until it coincides with the desired target.

It is clearly advantageous to run the system at high gain and low average brightness (below cutoff). This will facilitate observation of even small amounts of modulation and improve the angular resolution of the system. On the other hand, receiver overloading should be avoided, because limiting in the receiver will eventually make all signals appear as "straight" lines. In cases of moderate overload, the "triangular" shape, which the receiver pulses must have after passing through a bandpass network, makes it possible to still recognize some modulation. The modulation then shows up as widening and narrowing of the bright trace.

In any case it is clear that the radar operator should check his gain setting during each run and decrease gain as the target is approached because receiver overload may look just like an unmodulated line. Checks can easily be made to make sure that the "desired" target appears and disappears as a straight line as gain is changed. Automatic gain control may be added to the receiver. Its effect will be to eliminate nearly completely the need for the radar operator to change the gain during an approach after an initial gain setting has been made.

As a reasonable rule of thumb it is found that a single beam system can discriminate between objects separated by the beam width at half power and that in a crossed lobe system this azimuth resolution improves by a factor of about 20:1, the latter figure depending on the crossover point. With a beam width of 30° modulation can indeed be detected at about 1–2° deviation off-axis.

Since the radar is now highly directional the scanner axis and the pilot's sight axis must always be maintained parallel. As mentioned above, the pilot will keep his sight on the target during an approach. As the sight axis must be depressed by an appreciable amount in respect to the cannon axis (note that cannon axis and aircraft axis are parallel), this angular sensitivity makes it necessary to keep the scanner axis lined up accurately with the sight axis. For this purpose a simple aided tracking drive mechanism 48 is used to depress both scanner and sight by the proper amount.

It is possible, with this invention to discard much of the conventional gun laying system. This is due to the fact that the human eye when viewing a certain field can: compare intensity appearing at different places, distinguish position of light impressions, distinguish between stationary and moving impressions, and integrate over light impressions covering a period of approximately 1/15 second.

The ability of the eye to compare brightness in different parts of a field eliminates all comparison circuits; the ability to see motion takes over all those functions of a balanced detector which eliminate signals with a different modulation frequency; the time constant of the eye eliminates all integrating circuits. It should be noted that these functions constitute normal performance of the eye and thus do not put any strain on it. It is thus seen that by presenting the data in the proper form, the human eye can be made to take over several of the functions otherwise performed by circuits.

We have not yet considered the possible utilization of the position of any dot in a dotted line picture. Each of the four quadrants of a revolution corresponds to a horizontal band across the tube face. From the position of a dot there can be directly read the deviation of the radar reflection with respect to a coordinate system which is attached to the airplane. The amount of modulation, i. e., whether we see dots or dashes, gives a qualitative indication of the amount of deviation. This position of the dot may be used to provide a system for blind approaches to targets. The pilot may fly by this indication until it straightens out into a line.

The other system components shown in Fig. 2 include a range mark generator 54 whose output is applied to the vertical plate 42 to produce a pip or range marker. Since the screen is normally dark and it would therefore not be possible to see any normal range step marker at all times, it is necessary to intensify a single trace preferably at the bottom of the picture in order to make the range pip visible. In order to prevent blooming of the range step line at the point where video signals are present, it is necessary to eliminate the video during this time. All this is accomplished by applying a positive pulse from a vertical intensifier 50 at the proper time to the C. R. grid while simultaneously applying a negative voltage from a paralyzing generator 56, to the I. F. amplifier. This latter is to temporarily remove the video while the range marker is being produced. Flyback blanking of the vertical sweep is also employed.

The type of range step used in the earlier range system being of considerable amplitude and duration cannot be used here. If such a step were to coincide with a modulated signal a portion of the modulated signal might be offset enough to bridge the weaker portion or gap in the indication so that the modulation could not be seen. Thus a false indication of an unmodulated unbroken line might appear. For this reason the amplitude of the step must be kept to a very low value and in order to make it easier to see the step a small, very short impulse or pip may be superimposed on the step at its dropping edge.

Also shown in Fig. 2 is the optical sight 58 by which the pilot aims, the plane and cannon, the sight being mechanically synchronized with the axis of the scanner 30 by the dual drive from the aided tracking box 48. A manual control 60 is provided by which the radar operator may control the speed of the aided tracking system to match the ground speed of the plane.

Figure 3:
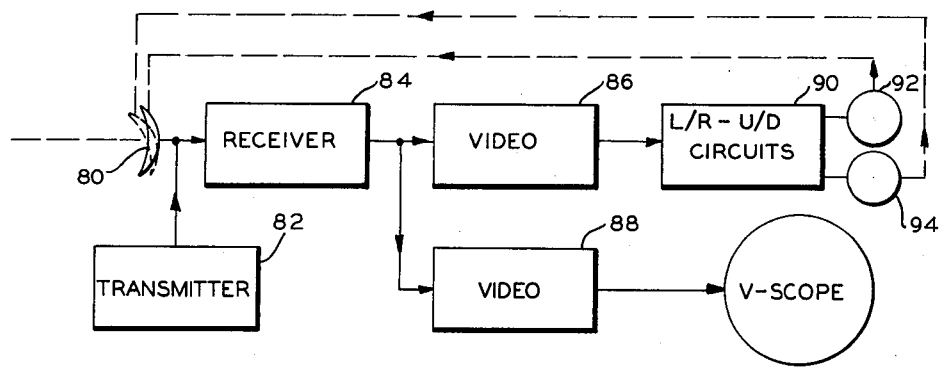
Fig. 3 is a block diagram showing an embodiment of the invention which provides a panoramic presentation of the region around a target being tracked.
Figure 4:
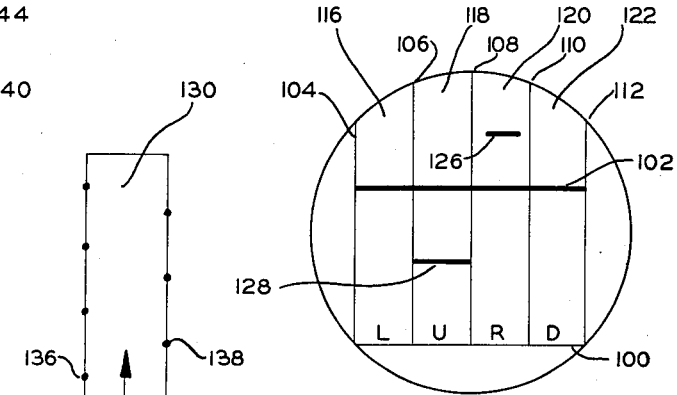
Fig. 4 is an illustration of a special case of the panoramic V presentation as used in blind approaches.

Referring now to Fig. 3 there is shown the block diagram of another embodiment of the invention which provides a panoramic view of the region covered by the scan at the same time that the radar is being used for tracking and gun laying on a chosen target. Included are a conical scan antenna 80, a radar transmitter 82 and receiver 84. Two video channels 86 and 88 are fed from the receiver 84. The output of one video 86 is fed to up-down and left-right circuits 90. The output of these circuits drives the follow-up circuits 92 and 94, respectively, which are coupled back to control the pointing of the scanner 80 and so automatically track a target. At the same time that this operation is going on, video signals from the other video channel are fed into a scope connected so as to provide a "V-presentation," as shown in Figs. 1 and 4. This presentation will now show the tracked target as an unmodulated line at its proper range. In addition if another target enters the range within the region covered by the scanning beam it will also be shown on the screen at its range. Its position on the screen will show whether it is to left or right or up or down from the target being tracked and also whether it is opening or closing in range thus providing information upon which subsequent action may be based.

In Fig. 4 there is shown a representation of the V-presentation of the situation just described and also as applicable to blind approaches. The scope is assumed to be so connected that range is measured upwards from zero line 100. The on-scanner-axis target being tracked shows up as unmodulated line 102. The dotted vertical lines of the figure 104, 106, 108, 110 and 112 indicate the boundaries of the four respective quadrants of scan. Thus, for example, the first area 116 may represent the left quadrant, the area 118 the up quadrant, the area 120 the right quadrant, the area 122 the down quadrant.

As shown there is another target 126 at longer range and in the right quadrant. A second additional target 128 appears in the panoramic indication at shorter range and upwards of the on-target axis. The advantage of the presentation lies in the panoramic showing of the area adjacent to the target simultaneously with the tracking process.

The oscilloscope presentation of this invention because of its adaptability to present easily intelligible on-axis target signal may be used to advantage as a homing or navigation aid for making approaches for blind landing. When the course of the plane deviates from the homing line of sight, modulation will appear and its position will show which way the pilot must turn to get back on homing course. The knowledge of being on a homing line plus the compass heading will determine for the pilot his relation to the home field, and so can judge whether he is approaching from a safe or an unsafe direction.

Figure 6:
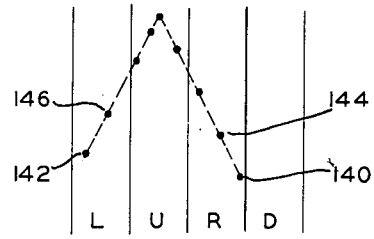
Fig. 5 shows the location of radar reflectors on an airstrip and Figs. 6, 7 and 8 illustrate the use of the presentation for blind landing on such a strip.
Figures 5, 7:
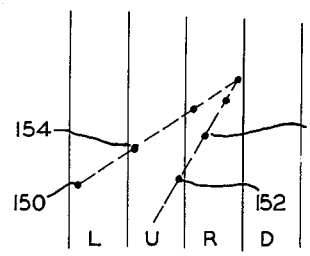

In explanation of how the invention is adaptable for blind approach and blind landing reference may be made to Figs. 5, 6, 7 and 8. Fig. 5 represents a landing strip 130 having located along its two margins a series of beacons or radar reflectors (for example corner reflectors). These beacons or reflectors designated as 132, 134, 136, 138 for example are staggered along the two airstrip margins.

Referring now to Fig. 6 there is shown the appearance of the V presentation scope as the plane approaches head-on to land. The left, up, and right quadrants carry the picture of the marginal reflector positions as shown, being the spots for example 140, 142, 144, 146, etc. If now the plane for example is headed too far to its own left as it approaches, there will appear the picture as shown in Fig. 7. The marginal spots such as 150, 152, 154 and 156, etc. will again form a V-shaped figure as in Fig. 6. However, the apex of the V will point to the right and means for the pilot that he must turn his plane to the right if he is to line up with the runway.

Figure 8:
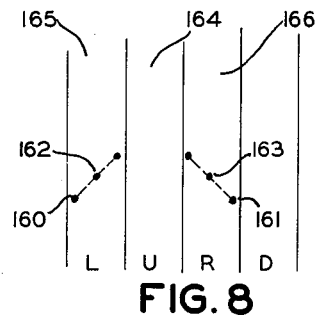

Finally, as the plane descends, the target spots 160, 161, 162, 163, etc. will move to the right and left as shown in Fig. 8 and will move down so that no spots will be present in the up quadrant area 164 but will be present in a much flatter V in the left and right quadrant areas 165 and 166. This picture will continue to open up and flatten until the plane grounds. By always keeping the point of the V in the center of the "up" quadrant area 164 a direct approach and landing will result.

What is claimed is:

1. Apparatus for indicating the range of an optically selected and sighted target and for distinguishing said target from any other targets at various ranges, comprising, a pulse generator, means responsive to the output of said pulse generator and including an antenna adapted to conically scan for transmitting said pulse generator output and receiving the target echoes thereof, an optical sight, means coordinating said sight with said antenna, a sawtooth signal generator responsive to the motion of said antenna, a sawtooth signal generator responsive to the output of said pulse generator, a cathode ray indicator having at least two mutually perpendicular pairs of deflection plates and an intensity control electrode, means coupling the output of one of said sawtooth signal generators to one of said pairs of plates, means coupling the output of the other of said sawtooth signal generators to the other of said pairs of plates and means coupling said received target echoes to said intensity control electrode.

2. In a pulsed radar system adapted to transmit radar pulses and receive the target echoes thereof, range indicating apparatus comprising an antenna adapted to conically scan at a preselected frequency, a cathode ray indicator having at least one electrode, vertical deflection plates and horizontal deflection plates, means for applying a sawtooth sweep voltage at one half said scan frequency to said vertical deflection plates, means for applying a sawtooth range sweep voltage at the radar pulse repetition frequency to said horizontal deflection plates and means for applying said received target echoes to said electrode as intensifier voltages.

3. In a pulsed radar system adapted to transmit radar pulses and receive the target echoes thereof, range indicating apparatus comprising, an adjustable optical sight for sighting a desired target, an antenna adapted to conically scan at a predetermined frequency, means for causing the axial direction of said scan antenna to follow the adjustments of said optical sight, means for generating a sawtooth voltage at a sub-multiple frequency of said scan frequency, means for generating a sawtooth voltage at the radar pulse repetition frequency, and means responsive to said sawtooth voltages and said received target echoes for indicating the range and the angular position, with respect to said axial direction, of each target scanned, said desired optically selected target being indicated as a continuous unmodulated line, the other of said scanned targets being indicated as broken, length-modulated lines.

4. Range indicating apparatus for use with an adjustable optical sight comprising, a pulse generator, means responsive to the output of pulse generator for transmitting said pulse generator output and receiving the target echoes thereof, said means including an antenna adapted to rotate about an axis thereof for conically scanning in the direction of said axis at a predetermined frequency, means for causing said axial direction of said antenna to follow the adjustments of said optical sight, a cathode ray indicator having at least vertical deflection plates, horizontal deflection plates and an intensifier electrode, means responsive to the output of said pulse generator for generating a sawtooth range sweep voltage at the repetition rate of the output of said pulse generator, means for applying said sawtooth range sweep voltage to said horizontal deflection plates, means for generating a sawtooth sweep voltage synchronized with the rotation of said scan antenna, means for applying said last-mentioned voltage to said vertical deflection plates and means for applying said received target echoes to said intensifier electrode.

5. Apparatus as in claim 4 wherein the directional axis of said scan antenna and the sight direction of the optical sight are substantially coincident, whereby an optically sighted target is indicated on said indicator as a vertical line of minimum modulation and other targets are indicated on said indicator as broken, length-modulated lines.

6. In a pulsed radar system adapted to transmit radar pulses and including a receiver for receiving the target echoes thereof, range indicating apparatus for providing an indication of the range of an optically selected and sighted target and for distinguishing said selected target from undesired targets, comprising, an antenna adapted to conically scan at a predetermined frequency, an adjustable optical sight, means for causing the axial direction of said scan antenna to follow the adjustments of said optical sight, a cathode ray indicator having at least first and second intensifier electrodes, a pair of horizontal deflection plates and a pair of vertical deflection plates, means for applying to said horizontal deflection plates a sawtooth sweep range voltage synchronized with said radar pulses and at the radar pulse repetition rate, means for applying to said vertical deflection plates a sawtooth sweep voltage synchronized with the scan of said antenna and having a second frequency that is a sub-multiple of said scan frequency, means for applying an intensifier gate at a repetition rate equal to said second frequency to said first intensifier electrode for intensifying the beam of said indicator, means for applying to said receiver a blocking gate in time coincidence with said intensifier gate for rendering said receiver inoperative for the duration of each of said blocking gates, each of said intensifier and blocking gates having a time duration equal at least to the time displacement between successive radar pulses, means for applying the output of said receiver to said second intensifier electrode for intensifying the beam of said indicator, means for generating pulses at the repetition rate of said radar pulses and displaced in time from said radar pulses, means for applying the output of said generator to said vertical deflection plates, whereby a pip indicative of said time displacement of said generated pulses is presented on said cathode ray indicator, and means for controlling said time displacement of said generated pulses for controlling the position of said pip on said indicator, said last-mentioned means being adapted to provide accurate range information of any targets aligned with said pip.

7. In a pulsed radar system adapted to transmit radar pulses and including a receiver for receiving the target echoes thereof, range indicating apparatus for use with projectile launching apparatus for providing an indication of an optically selected and sighted target, and for distinguishing said selected target from undesired targets, the launching direction of said launching apparatus being adjustable in angular position with respect to an arbitrarily selected reference axis, said range indicating apparatus comprising, an antenna adapted to conically scan at a predetermined frequency, an optical sight adjustable in angular relationship with respect to said launching direction, means for causing the axial direction of said scan antenna to follow the adjustments of said optical sight, a cathode ray indicator having at least first and second intensifier electrodes, a pair of horizontal deflection plates and a pair of vertical deflection plates, means for applying a sawtooth sweep range voltage at the radar pulse repetition rate to said horizontal deflection plates, means for applying a sawtooth sweep voltage at a second frequency to said vertical deflection plates, said second frequency having one of two values, one of said values being that of said scan frequency, the other of said values being a sub-multiple value of said scan frequency, means for applying to said first intensifier electrode an intensifier gate at a repetition frequency equal to said scan frequency for intensifying the beam of said cathode ray indicator, means for applying to said radar receiver a blocking gate in time coincidence with each of said intensifier gates for rendering said receiver inoperative for the duration of each of said blocking gates, each of said intensifier and blocking gates having a predetermined time duration that is a small fraction of the time duration of a sawtooth sweep voltage applied to said vertical deflection plates, means for applying the output of said radar receiver to said second intensifier electrode for intensifying the beam of said indicator, means for generating pulses at the pulse repetition frequency of said radar pulses and displaced in time from said radar pulses, means for applying the output of said generator to said vertical deflection plates whereby a pip is presented on said indicator, said pip being indicative of the time displacement of said generated pulses, and means for controlling said time displacement of said generated pulses and thereby controlling the position of said pip on said indicator, said last-mentioned means providing an accurate range information signal of a target represented on said indicator and aligned with said pip, and means responsive to said range information signal for controlling the angular position of said optical sight with respect to said launching direction, whereby a differential change in the range of the desired and optically selected target and a corresponding actuation of said time-displacement control means to cause said pip to follow said target, causes said angular position control means to produce a corresponding differential change in the angular relationship of said sight with respect to said launching axis, and, in order that said target may be again aligned with said sight, a corresponding differential change is required in the angular position of said launching direction with respect to said reference axis without changing the angular relationship between the gun sight and said launching direction.

References Cited in the file of this patent

UNITED STATES PATENTS

| Number | Name | Date |
|---|---|---|
| 1,951,533 | Schroter | Mar. 20, 1934 |
| 1,990,494 | Murphy | Feb. 12, 1935 |
| 2,130,913 | Tolson | Sept. 20, 1938 |
| 2,178,237 | Linder | Oct. 31, 1939 |
| 2,188,647 | Busse | Jan. 30, 1940 |
| 2,396,112 | Morgan | Mar. 5, 1946 |
| 2,405,930 | Goldberg | Aug. 13, 1946 |
| 2,408,414 | Donaldson | Oct. 1, 1946 |
| 2,408,742 | Eaton | Oct. 8, 1946 |

(Other references on following page)

UNITED STATES PATENTS

| | | |
|---|---|---|
| 2,412,702 | Wolff | Dec. 17, 1946 |
| 2,418,465 | Doba | Apr. 8, 1947 |
| 2,463,233 | Alexanderson | Mar. 1, 1949 |
| 2,471,264 | Doherty | May 24, 1949 |
| 2,500,552 | Lindenblad | Mar. 14, 1950 |
| 2,501,748 | Streeter | Mar. 28, 1950 |
| 2,502,974 | McElhannon | Apr. 4, 1950 |
| 2,503,060 | Miller | Apr. 4, 1950 |
| 2,687,520 | Fox | Aug. 24, 1954 |